(12) United States Patent
Matsen et al.

(10) Patent No.: US 8,480,823 B1
(45) Date of Patent: Jul. 9, 2013

(54) INDUCTION FORMING OF METAL COMPONENTS WITH INTEGRAL HEAT TREATMENT

(75) Inventors: Marc R. Matsen, Seattle, WA (US); William Dykstra, Rockford, MI (US)

(73) Assignee: The Boeing Company, Chicago, IL (US)

( * ) Notice: Subject to any disclaimer, the term of this patent is extended or adjusted under 35 U.S.C. 154(b) by 322 days.

(21) Appl. No.: 12/817,459

(22) Filed: Jun. 17, 2010

Related U.S. Application Data (63) Continuation-in-part of application No. 11/854,733, filed on Sep. 13, 2007, now Pat. No. 8,017,059.

(51) Int. Cl.
*H05B 6/02* (2006.01)
(52) U.S. Cl.
USPC ............ 148/574; 148/667; 148/691; 148/692
(58) Field of Classification Search
USPC .................. 148/567, 574, 666, 667, 691, 692
See application file for complete search history.

(56) References Cited

U.S. PATENT DOCUMENTS

| | | | |
|---|---|---|---|
| 5,410,132 A | 4/1995 | Gregg et al. | |
| 5,645,744 A | 7/1997 | Matsen et al. | |
| 5,705,794 A | 1/1998 | Gillespie et al. | |
| 5,728,309 A | 3/1998 | Matsen et al. | |
| 5,808,281 A | 9/1998 | Matsen et al. | |
| 6,528,771 B1 | 3/2003 | Matsen et al. | |
| 6,566,635 B1 | 5/2003 | Matsen et al. | |
| 6,653,608 B1 | 11/2003 | Matsen et al. | |
| 6,855,917 B2 | 2/2005 | Kirkwood et al. | |
| 6,884,966 B2 | 4/2005 | Coleman et al. | |
| 6,906,300 B2 | 6/2005 | Brown et al. | |
| 6,914,225 B2 | 7/2005 | Fischer et al. | |
| 2002/0117238 A1* | 8/2002 | Krajewski | 148/564 |
| 2004/0074889 A1* | 4/2004 | Coleman et al. | 219/243 |

* cited by examiner

*Primary Examiner* — Steven Bos
*Assistant Examiner* — Brian Walck
(74) *Attorney, Agent, or Firm* — Parsons Behle & Latimer (57) ABSTRACT

A metal induction forming method includes providing a metal sheet, cold forming the metal sheet by applying shaping pressure to the metal sheet, heating the metal sheet while applying shaping pressure to the metal sheet and quenching the metal sheet.

18 Claims, 9 Drawing Sheets

INDUCTION FORMING OF METAL COMPONENTS WITH INTEGRAL HEAT TREATMENT

CROSS-REFERENCE TO RELATED APPLICATIONS

This application is a continuation-in-part of U.S. Utility patent application Ser. No. 11/854,733, filed Sep. 13, 2007, now U.S. Pat. No. 8,017,059 and entitled COMPOSITE FABRICATION APPARATUS AND METHOD, which utility patent application is incorporated by reference herein in its entirety.

TECHNICAL FIELD

The disclosure relates to composite fabrication apparatus and methods. More particularly, the disclosure relates to an induction forming process which uses induction heating to allow rapid heating and cooling of aluminum and magnesium alloys in combination with the application of tool pressure to form and/or mold near net shaped parts at elevated temperatures with subsequent incorporation of an in-tool quenching step.

BACKGROUND

Processing techniques and facilities which enable widespread use of molded thermoplastic composite components at production rates and production costs and that allow significant weight savings scenarios may be desirable in some applications. The capability to rapidly heat, consolidate and cool in a controlled manner may be required for high production rates of composite components. Current processing techniques include the use of heated dies, and therefore, may not allow for the optimum controlled cool-down which may be required for optimum fabrication. Furthermore, current processing techniques may have limitations in forming the desired components since such techniques have limitations in the capability to hold the dimensions of the component accurately or maintain the composite in a fully consolidated state and may not optimize performance of the current resin systems.

Superplastic forming and hot forming methods for fabricating aluminum and to some extent magnesium components may be hampered by the inability to effectively integrate the superplastic forming process with the heat treatment requirements. The savings produced by the excellent formability at SPF temperatures may be nullified by the loss of dimensional control due to the need to solution-treat and quench the component after superplastic forming to produce competitive strength characteristics.

The lower strength of non-heat treatable alloys may be a significant contributing factor mainly as to why there has not been widespread implementation of the SPF of aluminum components in the aerospace industry. Moreover, the long cycles and low strength of characteristic of the current process may be deterrents to using the SPF of aluminum and magnesium in the automotive industry.

Therefore, an induction forming process is needed which uses induction heating to allow rapid heating and cooling of aluminum and magnesium alloys in combination with the application of tool pressure to form and/or mold near net shaped parts at elevated temperatures with subsequent incorporation of an in-tool quenching step.

SUMMARY

The disclosure is generally directed to a metal induction forming method. An illustrative embodiment of the metal induction forming method includes providing a metal sheet, cold forming the metal sheet by applying shaping pressure to the metal sheet, heating the metal sheet while applying shaping pressure to the metal sheet and quenching the metal sheet.

In some embodiments, the metal induction forming method may include providing an induction forming apparatus comprising a first tooling die and a second tooling die; placing a metal sheet between the first tooling die and the second tooling die; cold forming the metal sheet by applying the first tooling die and the second tooling die to the metal sheet; heating the first tooling die and the second tooling die while applying the first tooling die and the second tooling die to the metal sheet; quenching the metal sheet by cooling the first tooling die and the second tooling die; and removing the metal sheet from between the first tooling die and the second tooling die.

In some embodiments, the metal induction forming method may include providing an induction forming apparatus comprising a first tooling die and a second tooling die each having a plurality of laminated sheets; placing a metal sheet between the first tooling die and the second tooling die; cold forming the metal sheet by applying the first tooling die and the second tooling die to the metal sheet; heating the first tooling die and the second tooling die while applying the first tooling die and the second tooling die to the metal sheet; quenching the metal sheet by cooling the first tooling die and the second tooling die; and removing the metal sheet from between the first tooling die and the second tooling die.

In some embodiments, the metal induction forming method may include providing an induction forming apparatus comprising a first tooling die and a second tooling die each having a plurality of laminated sheets, a first contoured die surface on the first tooling die, a second contoured die surface on the second tooling die, a first die susceptor on the first contoured die surface and a second die susceptor on the second contoured die surface; placing a metal sheet selected from the group consisting of aluminum, aluminum alloy, magnesium and magnesium alloy between the first die susceptor and the second die susceptor; cold forming the metal sheet by applying the first die susceptor and the second die susceptor to the metal sheet; heating the first die susceptor and the second die susceptor while applying the first die susceptor and the second die susceptor to the metal sheet; quenching the metal sheet by spraying a quenching medium between the laminated sheets of the first tooling die and the second tooling die to cool the first die susceptor and the second die susceptor; and removing the metal sheet from between the first die susceptor and the second die susceptor. In some embodiments, the method may include some degree of hot die forming followed by pressurized gas forming. This may enable a die design that need not be as exacting but can also leverage the speed and thinning pattern attributed to hot matched die forming (opposite that of hot forming).

The disclosure is further generally directed to a thixoforming method. An illustrative embodiment of the method includes providing at least one thixotropic block, loading the thixotropic block into a cold die, rapidly heating the die and the thixotropic block, forming a structure from the thixotropic block, cooling the die and the structure and removing the structure from the die.

BRIEF DESCRIPTION OF THE ILLUSTRATIONS

DETAILED DESCRIPTION

Referring initially to FIGS. 1-7 of the drawings, a stacked tooling apparatus which is suitable for implementation of the composite fabrication method is generally indicated by reference numeral 1. The stacked tooling apparatus 1 may include a first die frame 2 and a second die frame 8. A first tooling die 3 may be provided on the first die frame 2, and a second tooling die 9 may be provided on the second die frame 8. The first tooling die and the second tooling die 9 may be hydraulically-actuated to facilitate movement of the first tooling die 3 and the second tooling die 9 toward and away from each other. The first tooling die 3 may have a first contoured die surface 4, whereas the second tooling die 9 may have a second contoured die surface 10 which is complementary to the first contoured die surface 4 of the first tooling die 3.

Figure 5:
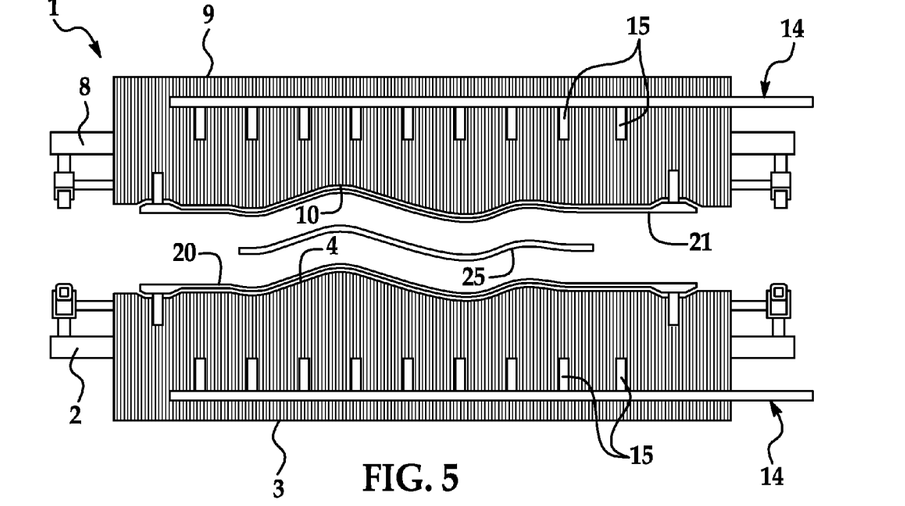
FIG. 5 is a sectional view of the tooling dies, with the tooling dies and die susceptors released from the composite sheet after forming and cooling of the composite sheet.
Figure 6:
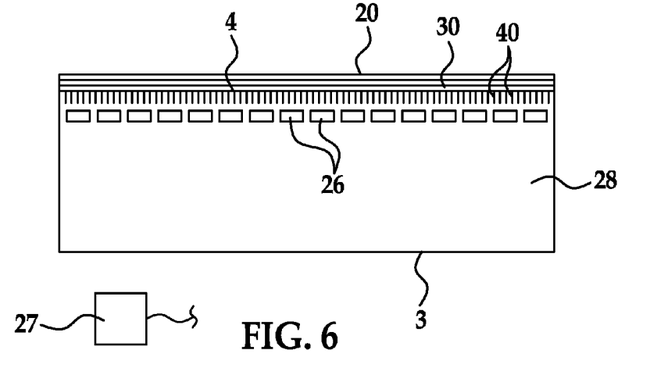
FIG. 6 is a schematic view of a tooling die, more particularly illustrating a die susceptor and die liner provided on the engaging surface of the tooling die and multiple induction coils extending through the tooling die.

As shown in FIG. 6, multiple induction coils 26 may extend through each of the first tooling die 3 (and the second tooling die 9, not shown) to facilitate selective heating of the first tooling die 3 and the second tooling die 9. A thermal control system 27 may be connected to the induction coils 26. A first die susceptor 20 may be thermally coupled to the induction coils 26 of the first tooling die 3. A second die susceptor 21 may be thermally coupled to the induction coils 26 of the second tooling die 9. Each of the first die susceptor 20 and the second die susceptor 21 may be a thermally-conductive material such as, but not limited to, a ferromagnetic material, cobalt, nickel, or compounds thereof. In some embodiments, each of the first die susceptor 20 and the second die susceptor 21 may be made of alloys including one or more of the ferromagnetic elements Iron, Nickel and Cobalt plus other elements of lesser fractions such as Molybdenum, Chromium, Vanadium and Manganese, for example and without limitation. As shown in FIGS. 1-5, the first die susceptor 20 may generally conform to the first contoured die surface 4 and the second die susceptor 21 may generally conform to the second contoured die surface 10.

As shown in FIG. 6, an electrically and thermally insulative coating 30 may be provided on the first contoured die surface 4 of the first tooling die 3, as shown, and on the second contoured die surface 10 of the second tooling die 9 (not shown). The electrically and thermally insulative coating 30 may be, for example, alumina or silicon carbide. The first die susceptor 20 may be provided on the electrically and thermally insulative coating of the first tooling die 3, as shown, and the second die susceptor 21 may be provided on the electrically and thermally insulative coating 30 of the second tooling die 9 (not shown).

Figure 4:
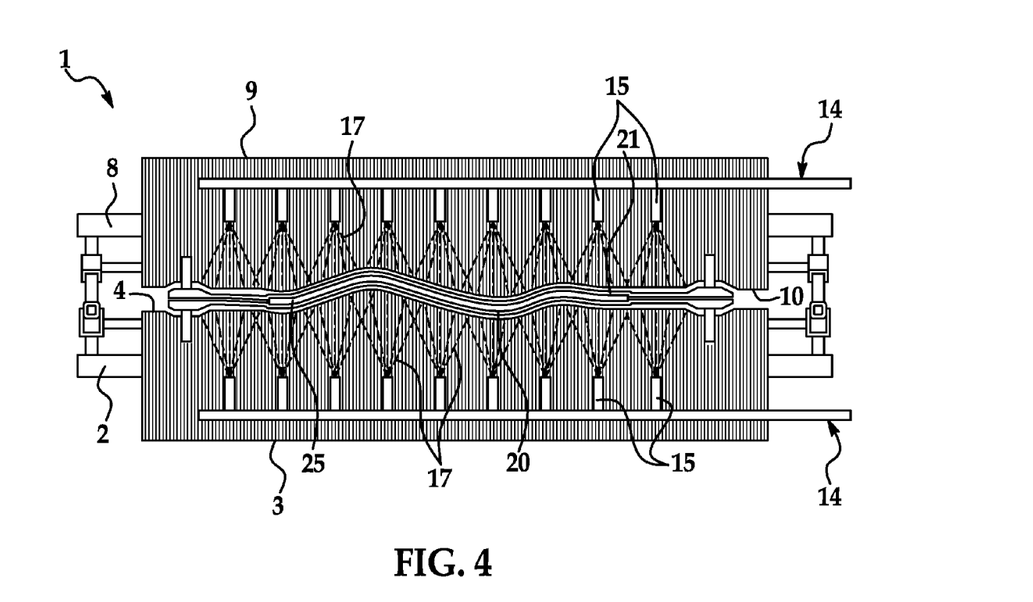
FIG. 4 is a sectional view of the tooling dies, with the tooling dies closed against the die susceptors and composite sheet and a cooling system engaged to cool the tooling dies.

As shown in FIGS. 1-5, a cooling system 14 may be provided in each of the first tooling die 3 and the second tooling die 9. The cooling system 14 may include, for example, coolant conduits 15 which have a selected distribution throughout each of the first tooling die 3 and the second tooling die 9. As shown in FIG. 4, the coolant conduit 15 may be adapted to discharge a cooling medium 17 into the first tooling die 3 or the second tooling die 9. The cooling medium 17 may be a liquid, gas or gas/liquid mixture which may be applied as a mist or aerosol, for example.

Figure 7:
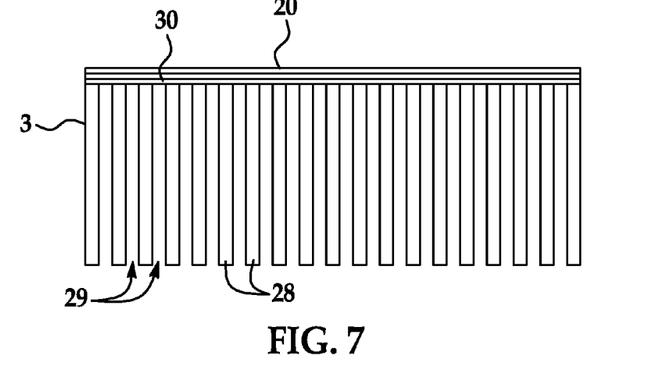
FIG. 7 is a front sectional view of a tooling die, more particularly illustrating multiple induction coils and multiple thermal expansion slots provided in the metal sheet.

Each of the first tooling die 3 and the second tooling die 9 may each include multiple stacked metal sheets 28 such as stainless steel which are trimmed to the appropriate dimensions for the induction coils 26. This is shown in FIGS. 6 and 7. The stacked metal sheets 28 may be oriented in generally perpendicular relationship with respect to the first contoured die surface 4 and the second contoured die surface 10. Each metal sheet 28 may have a thickness of from about 1/16" to about 1/2", for example and preferably 1/8". An air gap 29 may be provided between adjacent stacked metal sheets 28 to facilitate cooling of the first tooling die 3 and the second tooling die 9 (not shown). The stacked metal sheets 28 may be attached to each other using clamps (not shown), fasteners (not shown) and/or other suitable technique known to those skilled in the art. The stacked metal sheets 28 may be selected based on their electrical and thermal properties and may be transparent to the magnetic field. An electrically insulating coating (not shown) may, optionally, be provided on each side of each stacked sheet 28 to prevent flow of electrical current between the stacked metal sheets 28. The insulating coating may be a material such as ceramic, for example, or other high temperature resistant materials. However, if an air gap exists inbetween the stacked sheets, then no coating would be necessary. Multiple thermal expansion slots 40 may be provided in each stacked sheet 28, as shown in FIG. 6, to facilitate thermal expansion and contraction of the stacked tooling apparatus 1.

Figure 1:
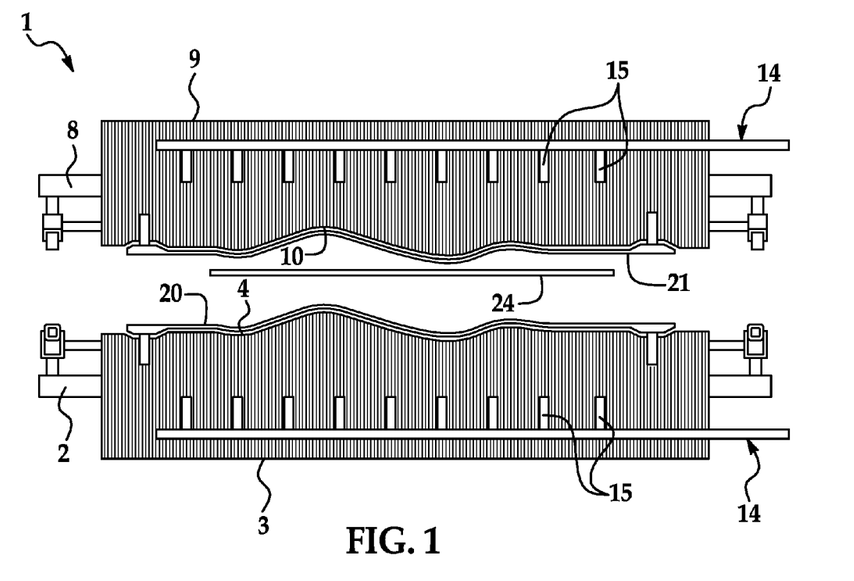
FIG. 1 is a sectional view of a pair of tooling dies of a stacked tooling apparatus, with molding compounds positioned between the tooling dies.
Figure 2:
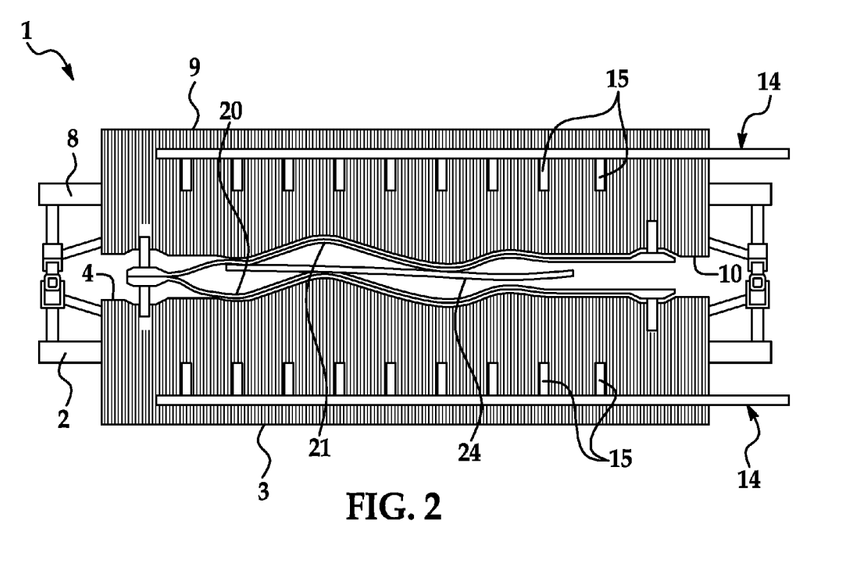
FIG. 2 is a sectional view of a pair of tooling dies, with the molding compounds enclosed between a pair of die susceptors provided on the tooling dies.
Figure 3:
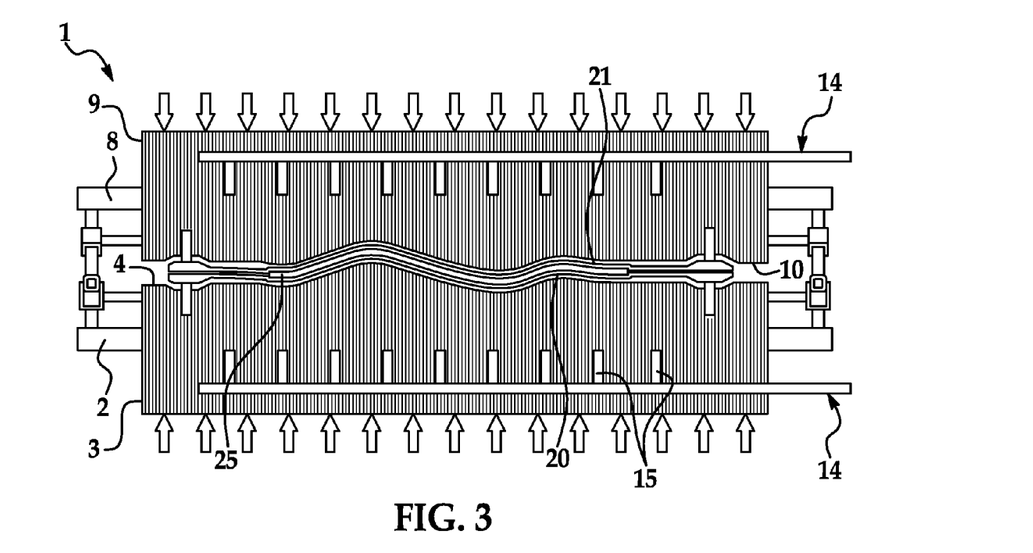
FIG. 3 is a sectional view of the tooling dies, with the tooling dies applying pressure to form and consolidate a composite sheet.

In typical implementation of the composite fabrication method, molding compounds 24 are initially positioned between the first tooling die 3 and the second tooling die 9 of the stacked tooling apparatus 1, as shown in FIG. 1. The first tooling die 3 and the second tooling die 9 are next moved toward each other, as shown in FIG. 2, as the induction coils 26 (FIG. 6) heat the first tooling die 3 and the second tooling die 9 as well as the first die susceptor 20 and the second die susceptor 21. Therefore, as the first tooling die 3 and the second tooling die 9 close toward each other, the first die susceptor 20 and the second die susceptor 21 rapidly heat the molding compounds 24. Thus, the molding compounds 24 which may be thermally molded as the first tooling die 3 and the second tooling die 9 continue to approach and then close against the molding compounds 24, as shown in FIG. 2, forming the molding compounds 24 to the configuration of a composite sheet 25 (shown in FIGS. 3-5) which may be defined by the first contoured surface 4 of the first tooling die 3 and the second contoured surface 10 of the second tooling die 9.

As shown in FIG. 4, the cooling system 14 is next operated to apply the cooling medium 17 to the first tooling die 3 and the second tooling die 9 and to the first die susceptor 20 and the second die susceptor 21. Therefore, the cooling medium 17 actively and rapidly cools the first tooling die 3 and the second tooling die 9 as well as the first die susceptor 20 and the second die susceptor 21, also cooling the composite sheet 25 sandwiched between the first die susceptor 20 and the second die susceptor 21. The composite sheet 25 remains sandwiched between the first tooling die 3 and the second tooling die 9 for a predetermined period of time until complete cooling of the composite sheet 25 has occurred. This allows the molded and consolidated composite sheet 25 to retain the structural shape which is defined by the first contoured surface 4 and the second contoured surface 10 after the first tooling die 3 and the second tooling die 9 are opened, as shown in FIG. 5. The formed and cooled composite sheet 25 is removed from the stacked tooling apparatus 1 without loss of dimensional accuracy or delamination of the composite sheet 25 when it is cooled at an appropriate property-enhancing rate.

Figure 8:
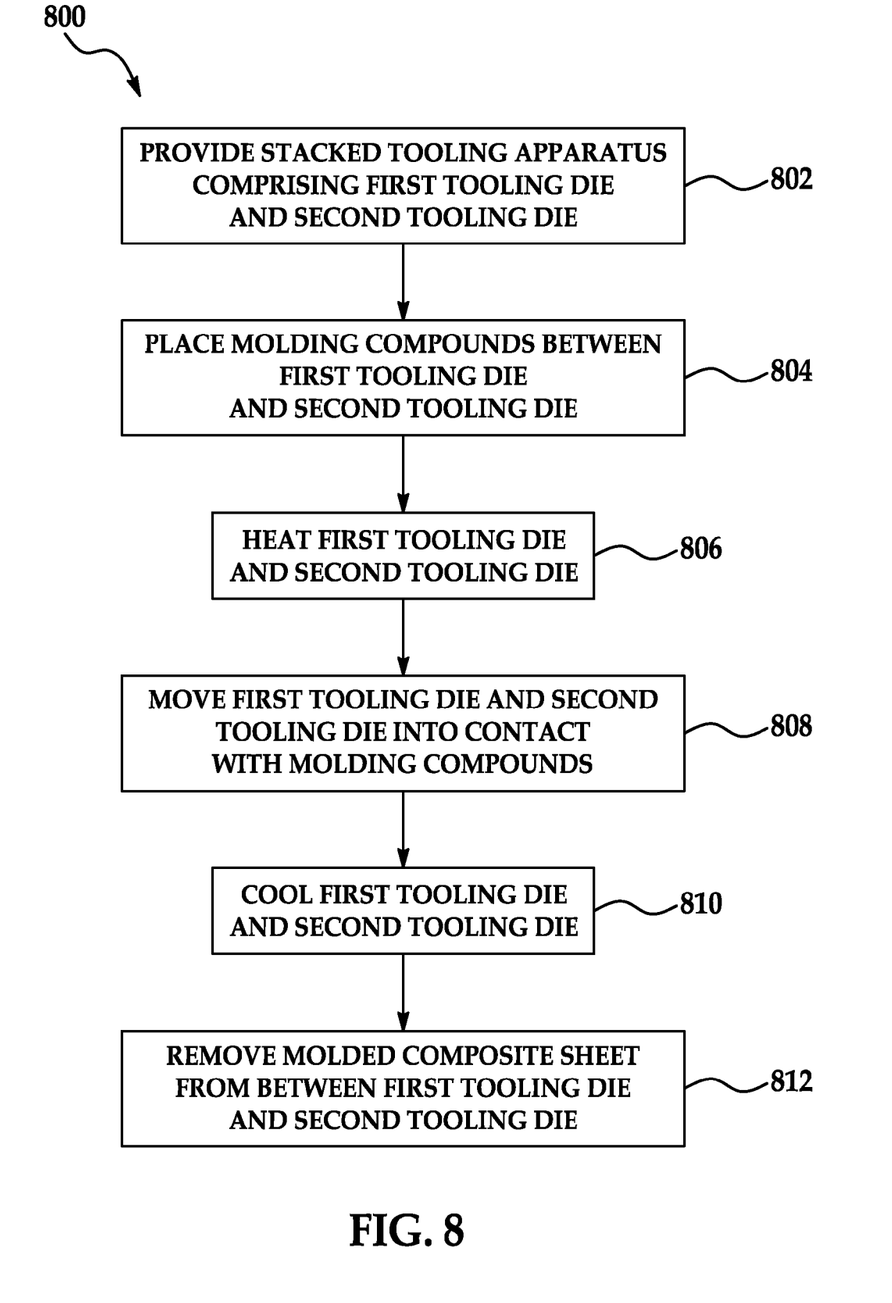
FIG. 8 is a flow diagram which illustrates an exemplary composite fabrication method.

Referring next to FIG. 8, a block diagram 800 which illustrates an exemplary composite fabrication method is shown. In block 802, a stacked tooling apparatus comprising a first tooling die and a second tooling die may be provided. In block 804, molding compounds may be placed between the first tooling die and the second tooling die. In block 806, the first tooling die and the second tooling die may be heated. In block 808, the first tooling die and the second tooling die may be moved into contact with the molding compounds. In block 810, the first tooling die and the second tooling die may be cooled. In block 812, a molded composite sheet is removed from between the first tooling die and the second tooling die.

Figure 9:
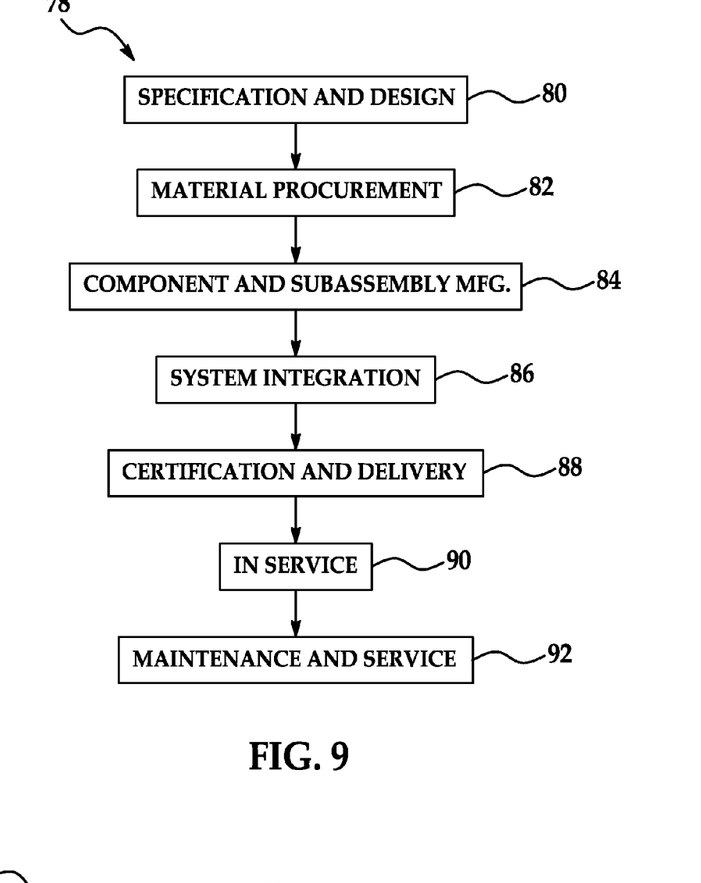
FIG. 9 is a flow diagram of an aircraft production and service methodology.
Figure 10:
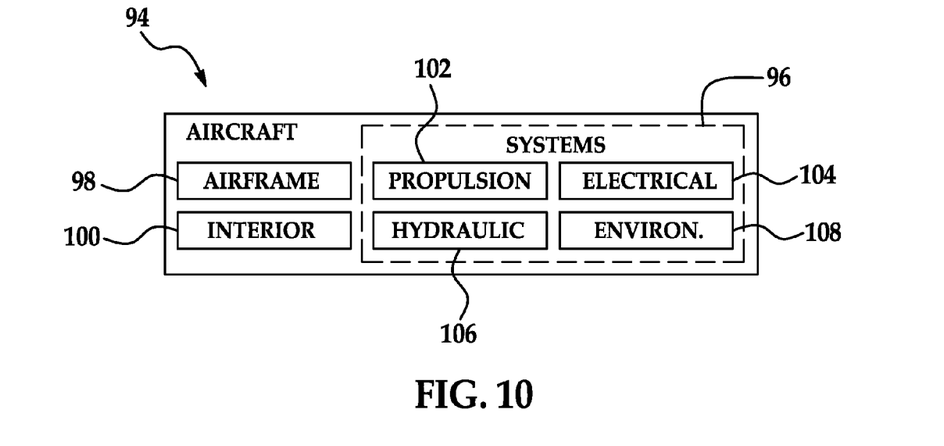
FIG. 10 is a block diagram of an aircraft.

Referring next to FIGS. 9 and 10, embodiments of the disclosure may be used in the context of an aircraft manufacturing and service method 78 as shown in FIG. 9 and an aircraft 94 as shown in FIG. 10. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 is scheduled for routine maintenance and service 90 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 10, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the invention may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Referring next to FIGS. 11-15 of the drawings, an induction forming apparatus which is suitable for implementation of the metal induction forming method is generally indicated by reference numeral 101. The apparatus 101 may include a first die frame 102 and a second die frame 108. A first tooling die 103 may be provided on the first die frame 102, and a second tooling die 109 may be provided on the second die frame 108. The first tooling die 103 and the second tooling die 109 may be hydraulically-actuated to facilitate movement of the first tooling die 103 and the second tooling die 109 toward and away from each other. The first tooling die 103 may have a first contoured die surface 104, whereas the second tooling die 109 may have a second contoured die surface 110 which is complementary to the first contoured die surface 104 of the first tooling die 103.

Figure 14:
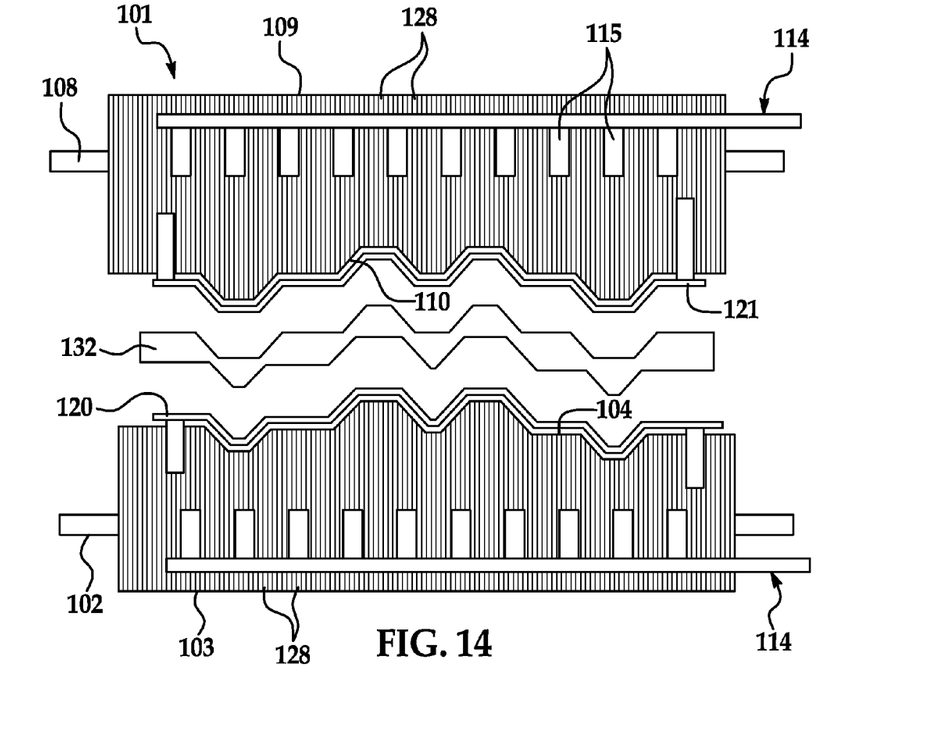
FIG. 14 is a sectional view of the tooling dies of the induction forming apparatus, with the tooling dies and die susceptors released from the shaped metal panel after forming and cooling of the metal sheet.
Figure 15:
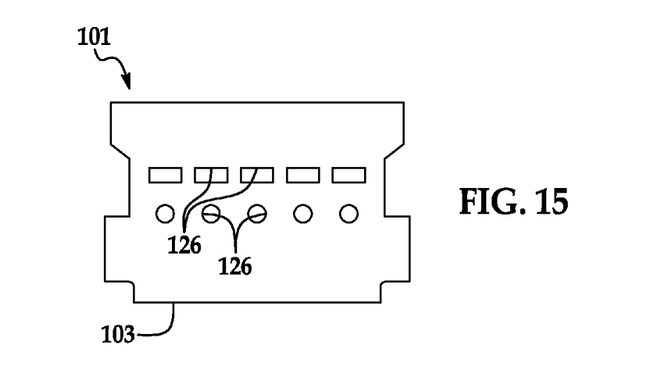
FIG. 15 is an end view of a tooling die of the induction forming apparatus, more particularly illustrating multiple induction coils extending through the tooling die.

As shown in FIG. 15, at least one set of induction coils 126 may extend through each of the first tooling die 103 (and the second tooling die 9, not shown) to facilitate selective heating of the first tooling die 103 and the second tooling die 109. In some embodiments, the induction coils 126 may be solenoid-shaped. A thermal control system 127 may be connected to the induction coils 126. A first die susceptor 120 may be thermally coupled to the induction coils 126 of the first tooling die 103. A second die susceptor 121 may be thermally coupled to the induction coils 126 of the second tooling die 109. Each of the first die susceptor 120 and the second die susceptor 121 may be a thermally-conductive material such as, but not limited to, a ferromagnetic material, cobalt, nickel, or compounds thereof. In some embodiments, each of the first die susceptor 120 and the second die susceptor 121 may be made of alloys including one or more of the ferromagnetic elements Iron, Nickel and Cobalt plus other elements of lesser fractions such as Molybdenum, Chromium, Vanadium and Manganese, for example and without limitation. As shown in FIGS. 11-14, the first die susceptor 120 may generally conform to the first contoured die surface 104 and the second die susceptor 121 may generally conform to the second contoured die surface 110.

Figure 11:
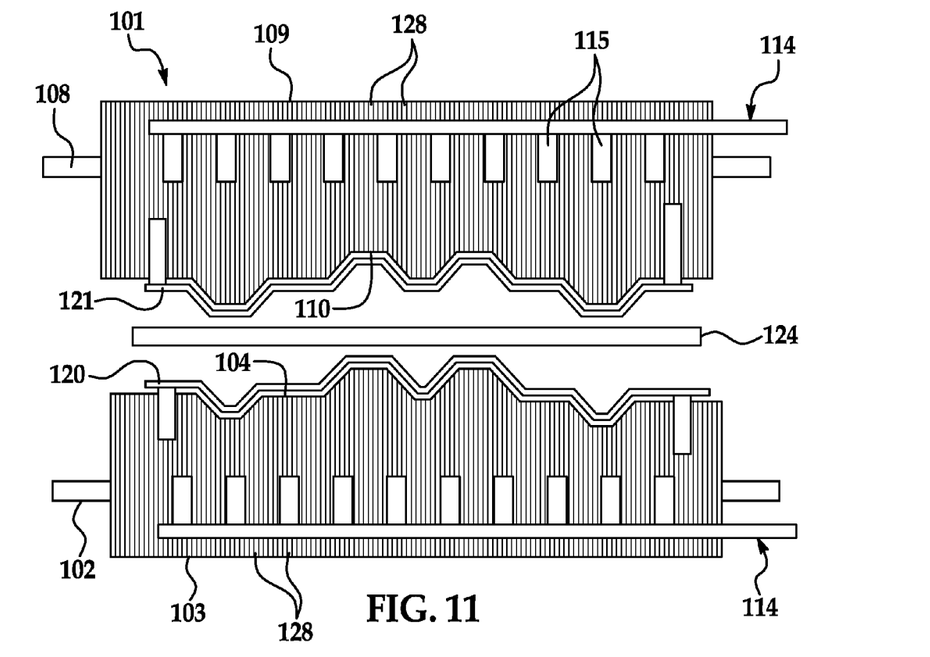
FIG. 11 is a sectional view of a pair of tooling dies of an induction forming apparatus, with a metal sheet positioned between the tooling dies.
Figure 12:
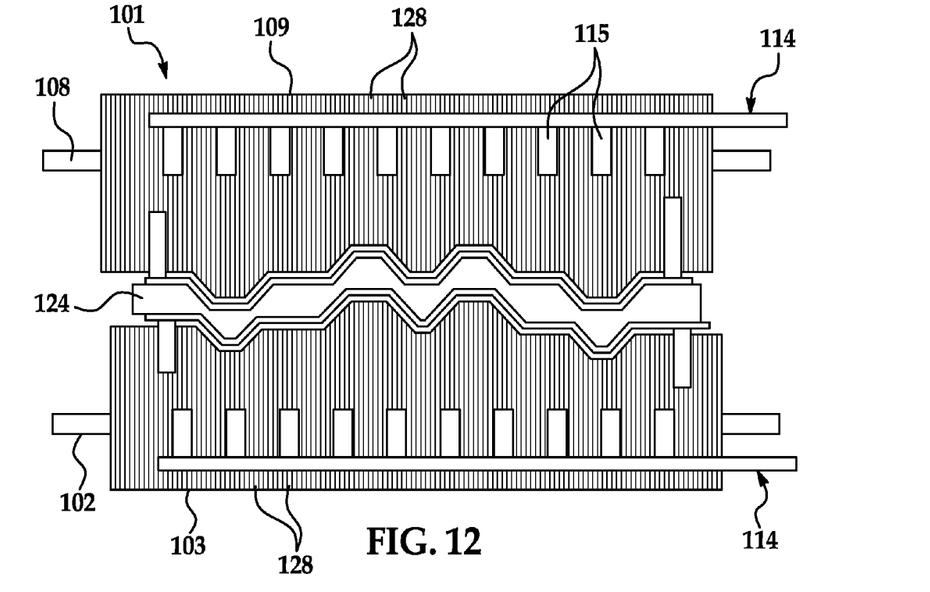
FIG. 12 is a sectional view of a pair of tooling dies of the induction forming apparatus, with the metal sheet enclosed between a pair of die susceptors provided on the tooling dies and the tooling dies applying pressure to form a shaped metal panel.
Figure 13:
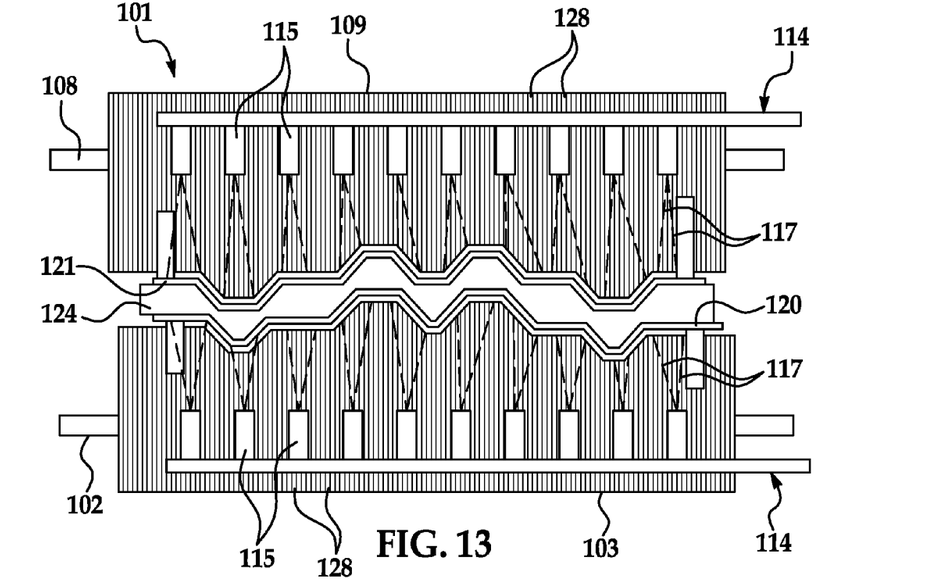
FIG. 13 is a sectional view of the tooling dies of the induction forming apparatus, with the tooling dies closed against the die susceptors and metal sheet and a cooling system engaged to cool the tooling dies and quench the shaped metal panel.

As shown in FIGS. 11-14, a cooling system 114 may be provided in each of the first tooling die 103 and the second tooling die 109. The cooling system 114 may include, for example, coolant conduits 115 which have a selected distribution throughout each of the first tooling die 103 and the second tooling die 109. As shown in FIG. 13, the coolant conduit 115 may be adapted to discharge a quenching medium 117 into the first tooling die 103 or the second tooling die 109. The quenching medium 117 may be a liquid, gas or gas/liquid mixture which may be applied as a mist or aerosol, for example. In some applications, the quenching medium 117 may be water.

Each of the first tooling die 103 and the second tooling die 109 may each include multiple laminated metal sheets 128 such as stainless steel which are trimmed to the appropriate dimensions for the induction coils 126. The stacked metal sheets 128 may be oriented in generally perpendicular relationship with respect to the induction coils 126. An air gap (not shown) may be provided between adjacent stacked metal sheets 128 to facilitate cooling of the first tooling die 103 and the second tooling die 109 (not shown). The laminated metal sheets 128 may be attached to each other using clamps (not shown), fasteners (not shown) and/or other suitable technique known to those skilled in the art. The laminated metal sheets 28 may be selected based on their electrical and thermal properties and may be transparent to the magnetic field. An electrically insulating coating (not shown) may, optionally, be provided on each side of each laminated sheet 128 to prevent flow of electrical current between the laminated metal sheets 128. The insulating coating may be a material such as ceramic, for example, or other high temperature resistant materials. However, if an air gap exists in between the stacked sheets, then no coating may be necessary. Multiple thermal expansion slots (not shown) may be provided in each stacked sheet 128 to facilitate thermal expansion and contraction of the apparatus 101.

In typical implementation of the metal induction forming method, a metal plate 124 is initially positioned between the first tooling die 103 and the second tooling die 109 of the stacked tooling apparatus 101, as shown in FIG. 11. In some applications, the metal plate 124 may be aluminum, magnesium or alloys thereof, for example and without limitation. The first tooling die 103 and the second tooling die 109 are next moved toward each other, as shown in FIG. 12, until the metal plate 124 is initially partially formed between the first die susceptor 120 and the second die susceptor 121. Once the cold forming limit of the metal plate 124 is reached, the induction coils 126 are energized to heat the first die susceptor 120 and the second die susceptor 121 to the induction forming temperature. In aluminum alloy applications, the induction forming temperature may be between about 900~1000 degrees F. Accordingly, the induction coils 126 heat the first die susceptor 120 and the second die susceptor 121, which form or shape the metal sheet 124 to the contour of the first contoured die surface 104 and the second contoured die surface 110. This step may also include the stamping/flow (molding) of material for thickness changes in portions of the metal sheet 124 in which thickness reducing and thickness increases are needed.

As shown in FIG. 13, the cooling system 114 is next operated to apply the quenching medium 117 between the laminated sheets 128 of the first tooling die 103 and the second tooling die 109 and directly against the first die susceptor 120 and the second die susceptor 121. Therefore, the quenching medium 117 may impinge directly against the first die susceptor 120 and the second die susceptor 121 and actively and rapidly cool the first tooling die 3 and the second tooling die 109 as well as the first die susceptor 120 and the second die susceptor 121. In turn, the first die susceptor 120 and the second die susceptor 121 quench the formed metal panel 132 sandwiched between the first die susceptor 120 and the second die susceptor 121. The formed metal panel 132 may remain sandwiched between the first tooling die 103 and the second tooling die 10 for a predetermined period of time until complete cooling or quenching of the formed metal panel 132 has occurred. This may allow the formed metal panel 132 to retain the structural shape which is defined by the first contoured surface 104 and the second contoured surface 110 after the first tooling die 103 and the second tooling die 109 are opened, as shown in FIG. 14. Once cooled to room temperature, the formed metal panel 132 may be removed from the apparatus 101 without loss of dimensional accuracy or stability of the formed metal panel 132 when it is cooled at an appropriate property-enhancing rate. The formed metal panel 132 may be subsequently aged to achieve maximum strength by any number of heating methods known to those skilled in the art. The first tooling die 103 and the second tooling die 109 may be made dimensionally thin and capable of being cooled at rates that enable the formed metal panel 132 to be solution treated.

The method may have the capability to form complex components in addition to performing the solution treatment of these components in the same rapid thermal cycle. The process may use induction heating with smart susceptors in conjunction with laminate tooling designs to create a forming tool that exhibits very little thermal inertia and heats rapidly and exactly to optimum forming/solution-treatment temperatures for the various aluminum alloys (between 900 F and 1000 F). This same process may be used to form and heat-treat magnesium alloys. These components may have very complex geometries as enabled by the ability to use gas forming and also molded in changes in thickness due to the ability to mold in changes in materials thicknesses. Therefore, high quality, complex, lightweight aluminum and magnesium near net shaped solution treated components may be fabricated rapidly and the needed dimensional control may still be achieved.

Figure 16:
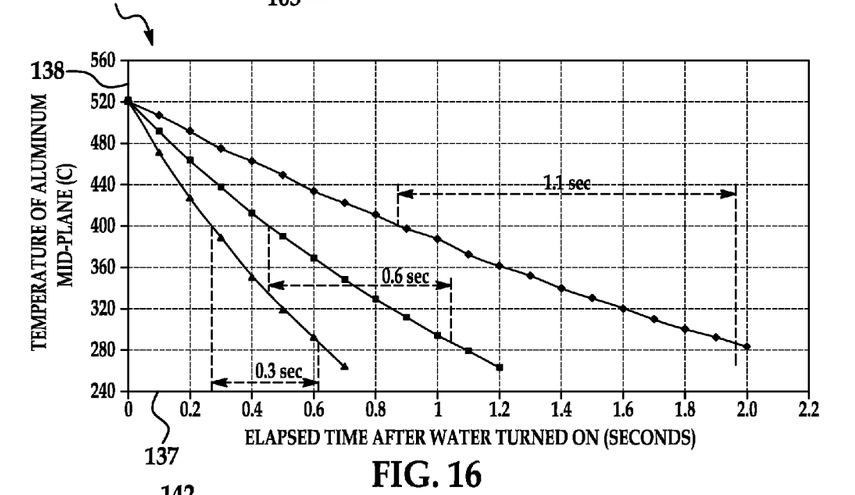
FIG. 16 is a graph which illustrates the effect of susceptor thickness on quenching rates of the shaped metal panel.

A graph 136 which illustrates the effect of susceptor thickness on quenching rates of the shaped metal panel is shown in FIG. 16. The elapsed time after quenching water is turned on (in seconds) is plotted along the X-axis 137. The temperature of the metal sheet mid-plane (degrees C.) is plotted along the Y-axis 138.

Figure 17:
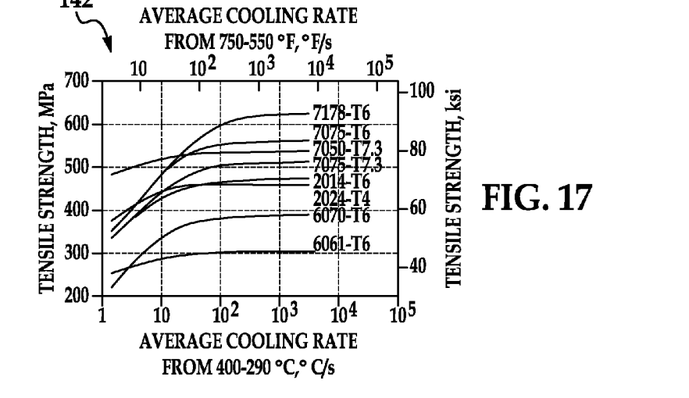
FIG. 17 is a graph which illustrates the required cooling rates needed to meet full alloy strength potentials.

A graph 142 which illustrates the required cooling rates needed to meet full alloy strength potentials is shown in FIG. 17. Typical heat treatment response of standard aluminum alloys given quenching rates shows that for thinner susceptors, adequate quenching for most alloys is attainable.

Figure 18:
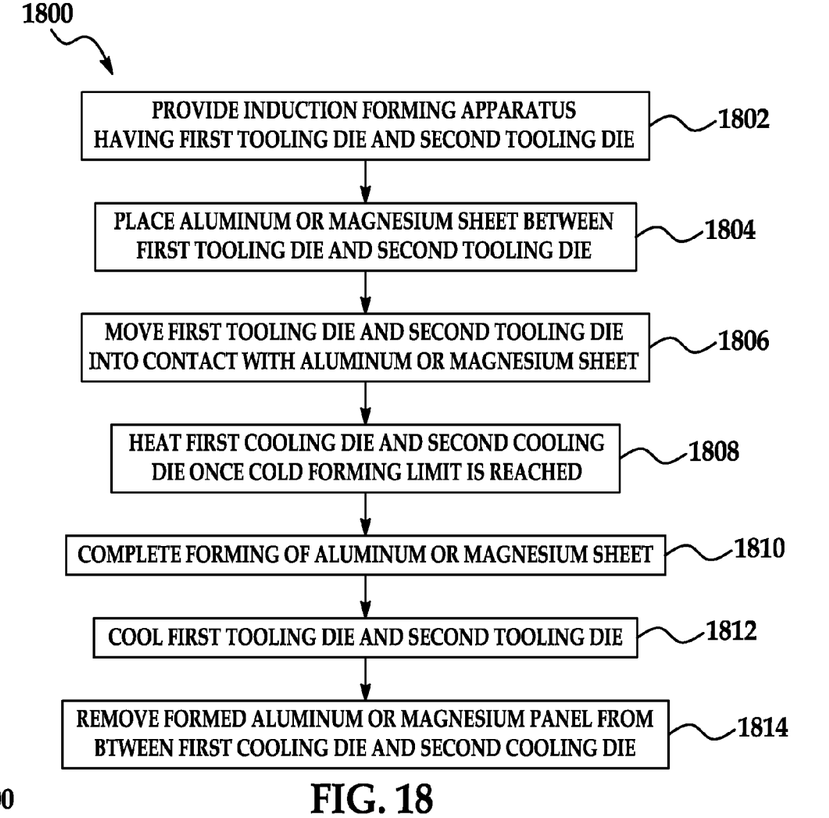
FIG. 18 is a flow diagram of a metal induction forming method.

Referring next to FIG. 18, a block diagram 1800 which illustrates an exemplary metal forming induction method is shown. In block 1802, an induction forming apparatus comprising a first tooling die and a second tooling die may be provided. In block 1804, a metal sheet may be placed between the first tooling die and the second tooling die. In some applications, the metal sheet may be aluminum, magnesium or alloys thereof. In block 1806, the first tooling die and the second tooling die may be moved into contact with the metal sheet. In block 1808, the first tooling die and the second tooling die may be heated once the cold forming limit of the first tooling die and the second tooling die has been reached.

In block 1810, forming or shaping of the metal sheet may be completed. In block 1812, the resulting formed metal panel may be quenched by cooling the first tooling die and the second tooling die. The first tooling die and the second tooling die may be cooled by spraying a quenching medium against the first tooling die and the second tooling die. In some applications, the quenching medium may be water. In block 1814, the formed metal panel is removed from between the first tooling die and the second tooling die. In block 1816, in some embodiments the panel may be subjected to pressurized gas forming which follows hot die forming. This may enable a die design that need not be as exacting but can also leverage the speed and thinning pattern attributed to hot matched die forming (opposite that of hot forming).

Figure 19:
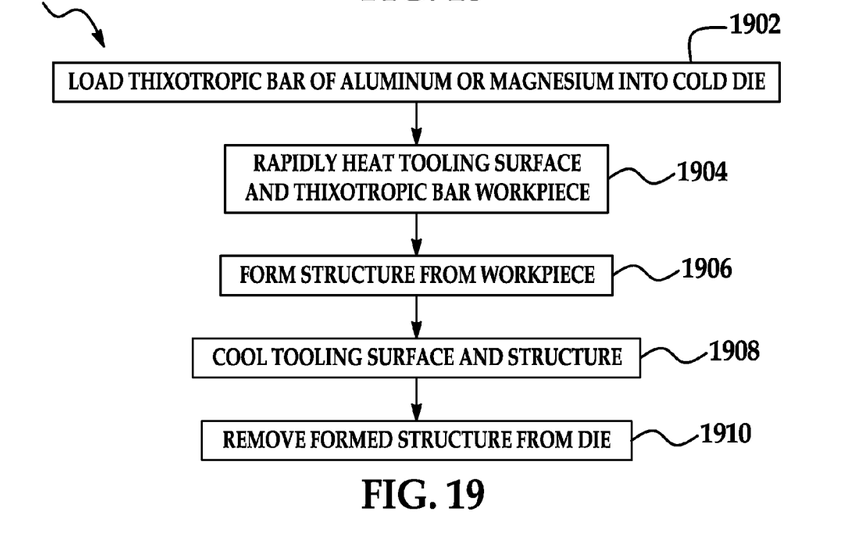
FIG. 19 is a flow diagram of a thixoforming method.

Referring next to FIG. 19, a flow diagram 1900 which illustrates an exemplary thixoforming process is shown. The process 1900 may be suitable for large thixoforming operations using thoxitropic blocks as the starting material. The process 1900 may be particularly suitable for magnesium due to the difficulty in producing sheet materials with magnesium. In block 1902, a thixotropic bar of aluminum or magnesium may be loaded into a cold die. In block 1904, the tooling surface and the thixotropic bar workpiece may be rapidly heated to facilitate flowing of the workpiece and enable formation of a large thin structure in block 1906. In block 1908, the tooling surface and the structure may be cooled. In block 1910, the formed structure may be removed from the die.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A metal induction forming method, comprising:
   using an induction forming apparatus comprising a first tooling die and a second tooling die, each having a plurality of laminated sheets;
   placing a metal sheet between said first tooling die and said second tooling die;
   cold forming said metal sheet by applying said first tooling die and said second tooling die to said metal sheet;
   heating said metal sheet while applying said first tooling die and said second tooling die to said metal sheet; and
   quenching said metal sheet.

2. The method of claim 1 wherein placing a metal sheet comprises placing a metal sheet selected from the group consisting of an aluminum sheet and an aluminum alloy sheet.

3. The method of claim 1 wherein placing a metal sheet comprises placing a metal sheet selected from the group consisting of a magnesium sheet and a magnesium alloy sheet.

4. The method of claim 1 wherein heating said metal sheet comprises heating said metal sheet to a temperature range of about 900 to about 1000 degrees F.

5. The method of claim 1 wherein quenching said metal sheet comprises quenching said metal sheet by spraying a quenching medium between the plurality of laminated sheets of the first tooling die and the second tooling die.

6. The method of claim 1 wherein said heating step is conducted by an induction heating technique utilizing induction coils.

7. The method of claim 1 wherein said step of quenching said metal sheet is conducted by cooling said first tooling die and said second tooling die by discharging a cooling medium into said first tooling die and said second tooling die.

8. The method of claim 7 wherein said cooling medium is a liquid, gas or gas/liquid mixture.

9. The method of claim 7 further comprising:
   providing induction coils in each of said first tooling die and said second tooling die; and
   heating said first tooling die and said second tooling die by energizing said induction coils.

10. The method of claim 9 further comprising:
    using a first die susceptor comprised by said first tooling die and a second die susceptor comprised by said second tooling die; and
    wherein heating said first tooling die and said second tooling die comprises heating said first die susceptor and said second die susceptor.

11. The method of claim 7 wherein quenching said metal sheet further comprises:
    providing a plurality of coolant conduits in each of said first tooling die and said second tooling die; and
    discharging said cooling medium through said plurality of coolant conduits and into said first tooling die and said second tooling die.

12. The method of claim 7 further comprising the step of placing a metal sheet selected from the group consisting of an aluminum sheet and an aluminum alloy sheet between said first tooling die and said second tooling die.

13. The method of claim 7 further comprising the step of placing a metal sheet selected from the group consisting of a magnesium sheet and a magnesium alloy sheet between said first tooling die and said second tooling die.

14. A metal induction forming method, comprising:
    providing an induction forming apparatus comprising a first tooling die and a second tooling die each having a plurality of laminated sheets;
    placing a metal sheet between said first tooling die and said second tooling die;
    cold forming said metal sheet by applying said first tooling die and said second tooling die to said metal sheet;
    heating said first tooling die and said second tooling die while applying said first tooling die and said second tooling die to said metal sheet;
    quenching said metal sheet by cooling said first tooling die and said second tooling die; and
    removing said metal sheet from between said first tooling die and said second tooling die.

15. The method of claim 14 wherein quenching said metal sheet by cooling said first cooling die and said second cooling die comprises discharging a cooling medium into said first tooling die and said second tooling die.

16. The method of claim 15 wherein said cooling medium is a liquid, gas or gas/liquid mixture.

17. The method of claim 14 further comprising subjecting said metal sheet to pressurized gas forming.

18. The method of claim 14 further comprising:
    providing induction coils in each of said first tooling die and said second tooling die; and
    wherein heating said first tooling die and said second tooling die comprises energizing said induction coils.

* * * * *